Figure 1:
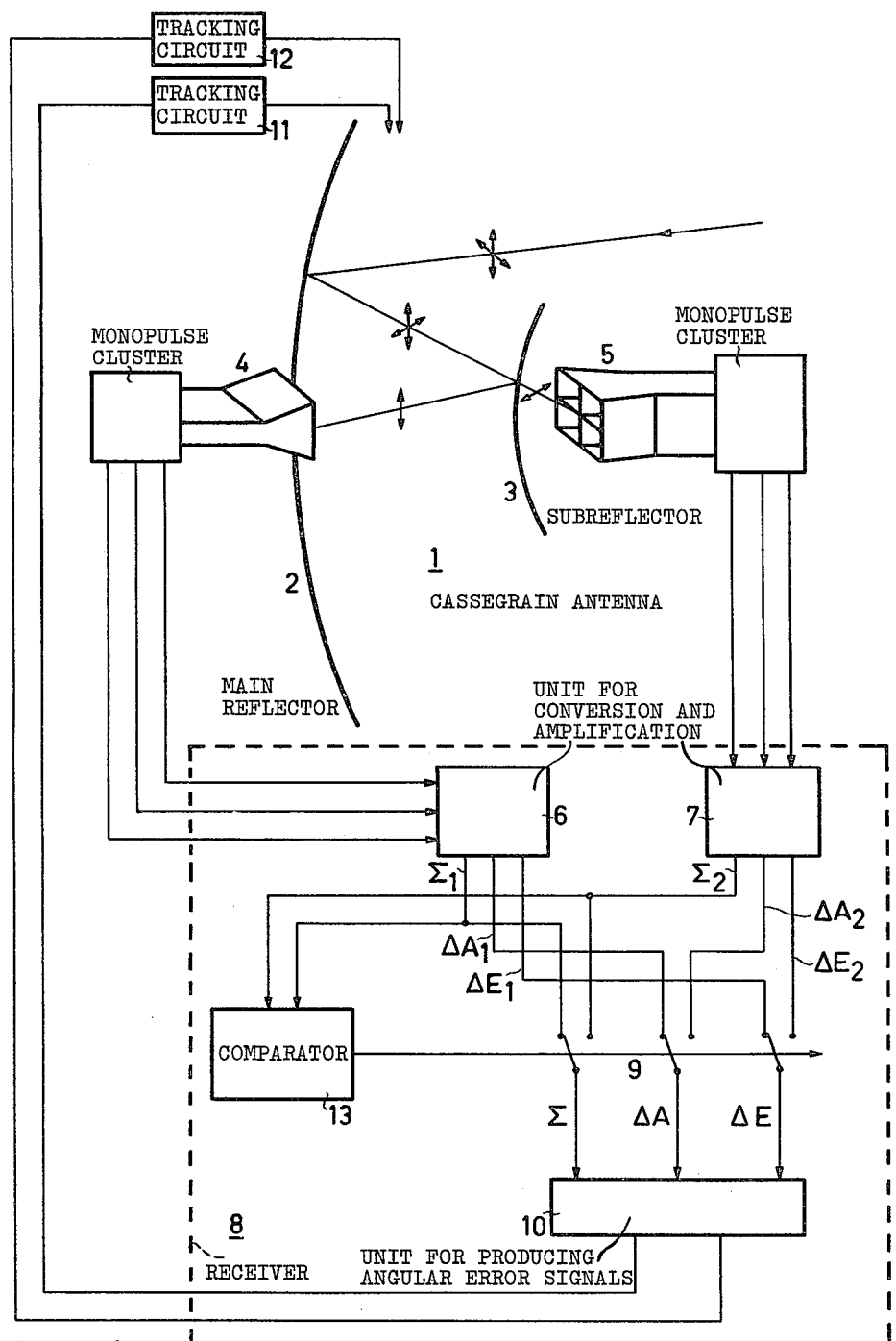

United States Patent [19]

Vaessen

[11] 4,213,130
[45] Jul. 15, 1980

[54] MONOPULSE RADAR APPARATUS
[75] Inventor: Dorotheus C. L. Vaessen, Hengelo, Netherlands
[73] Assignee: Hollandse Signaalapparaten B.V., Hengelo, Netherlands
[21] Appl. No.: 951,683
[22] Filed: Oct. 16, 1978
[30] Foreign Application Priority Data
Nov. 7, 1977 [NL] Netherlands ................. 7712216
[51] Int. Cl.² ............................................. G01S 9/22
[52] U.S. Cl. ........................... 343/16 M; 343/100 PE
[58] Field of Search ...................... 343/16 M, 100 PE
[56] References Cited
U.S. PATENT DOCUMENTS

| | | | |
|---|---|---|---|
| 3,209,355 | 9/1965 | Livingston | 343/100 PE |
| 3,266,035 | 8/1966 | Farner | 343/7.4 |
| 3,772,701 | 11/1973 | Wilkinson | 343/100 PE X |
| 3,805,268 | 4/1974 | Britt | 343/16 M X |
| 3,827,049 | 7/1974 | Van Staaden et al. | 343/16 M X |
| 4,028,708 | 6/1977 | Woodward | 343/16 M X |
| 4,030,048 | 6/1977 | Foldes | 343/16 M X |

Primary Examiner—T. H. Tubbesing
Attorney, Agent, or Firm—Algy Tamoshunas

[57] ABSTRACT

The invention relates to monopulse radar for automatic angle tracking of a moving target, which prevents angle tracking errors from occurring when the polarization of the received signals is orthogonal to the polarization of the radar receiver. The monopulse radar comprises two monopulse clusters (4, 5) tuned to the same frequency band and arranged to receive mutually orthogonal polarizations; only one of these clusters lends itself for the transmission of r.f. signals. When supplied sum and difference signals by the two clusters (4, 5), the receiver (8) produces the angular error signals required to keep the radar directed at the target. The error signals are determined by the amplitude ratio between the difference signals and the sum signal from the first cluster or by the amplitude ratio between the difference signals and the sum signal from the second cluster, depending on the ratio between the sum signals from the two clusters.

6 Claims, 3 Drawing Figures

MONOPULSE RADAR APPARATUS

The invention relates to a monopulse radar for automatic angle tracking of a moving target. Such radar systems are known in various embodiments and are described by applicant in U.S. Pat. Nos. 3,467,963, 3,550,126, 3,708,794 and 3,728,723. One drawback of all of these monopulse radar systems is that very large angle-tracking errors are likely to occur if the return signals are orthogonal or substantially orthogonal to the plane of polarisation of the radar receiver and in extreme cases it is even possible for the monopulse radar to lose its target completely. This disadvantage has already been pointed out in an article by M. L. Lees entitled "Cross-polarisation tracking errors on a linearly polarised monopulse radar", Proceedings of the IREE Australia, October 1976, pp. 306–310. The article, however, does not present a solution to the problem in question.

In case the radar receiver is arranged to receive, for example, vertical polarisation, and the polarisation of the incident radiation is horizontal or substantially horizontal, the use of a horizontal wire grid in the antenna seems an obvious solution to prevent the development of angle-tracking errors. However, this solution is satisfactory only to a limited extent; it is true that a significant reduction in errors is achieved, but with the antenna housed in a radome this is accompanied with an increased sensitivity to horizontal polarisation in the case in question. Moreover, the solution does not suffice if the radar receiver is elliptically polarised and the polarisation of the radar return signals is orthogonal or substantially orthogonal thereto.

It is the object of the invention to provide a satisfactory solution to the aforementioned problem, that is to prevent angle-tracking errors in all cases when the polarisation of the received radiation is orthogonal or substantially orthogonal to the polarisation that the radar is designed to receive.

In accordance with the invention, the monopulse radar system comprises: a first and a second monopulse cluster, each adapted to receive r.f. signals in four receiving patterns symmetrically disposed with respect to the antenna axis of symmetry and to convert the r.f. signals into first and second sum signals and into first and second difference signals. The two monopulse clusters are tuned to the same frequency band and are arranged to receive mutually orthogonal polarisations with the r.f. signals being transmitted through one monopulse cluster only. The system further comprises a receiver provided with a switching unit. The receiver—in response to the sum and the difference signals from the two monopulse clusters—delivers angular error signals, the amplitude and the polarity of each error signal being dependent upon the amplitude ratio between either the first sum signals and the relevant first difference signals, or the second sum signals and the relevant second difference signals. The amplitude ratio thus, varies in accordance with the target deviation with respect to the antenna axis of symmetry. The system further includes a tracking circuit for each of the angle coordinates, the tracking circuits being controlled by the relevant angular error signal from the receiver.

The U.S. Pat. No. 3,827,049 describes a monopulse radar sytem comprising two monopulse clusters and a receiver provided with a switching unit. The receiver—in response to the sum and the difference signals from the two monopulse clusters—delivers angular error signals, the amplitude and the polarity of each error signal being dependent upon the amplitude ratio between either the first sum signals and the relevant first difference signals, or the second sum signals and the relevant second difference signals. The system of the patent further includes a tracking circuit for each of the angle coordinates which is controlled by the relevant angular error signal from the receiver. However, in this monopulse radar, the two monopulse clusters are tuned to the X and the Ka bands. This specific selection makes it possible to prevent, within a certain range, angle tracking errors caused by the reception of target returns reflected by the earth's surface, in addition to the return signals reflected directly by the target. Moreover, the two monopulse clusters of the system disclosed in the patent are positioned in the antenna at right angles to each other; this arrangement bears upon the specific design of the Cassegrain antenna used in the system. Despite their arrangement, the two monopulse clusters are designed to receive radiation which is of like linear polarisation. When tracking a target in the Ka-frequency band, if the polarisation of the received return signals is orthogonal or substantially orthogonal to the polarisation of the Ka-band monopulse cluster, angle-tracking errors will again arise. These tracking errors may be eliminated in accordance with the invention, by using a second Ka-band monopulse cluster. With the Cassegrain antenna referred to in the cited U.S. patent, this second cluster will, for that purpose, form an integrated part of the X-band monopulse cluster.

Figure 2:
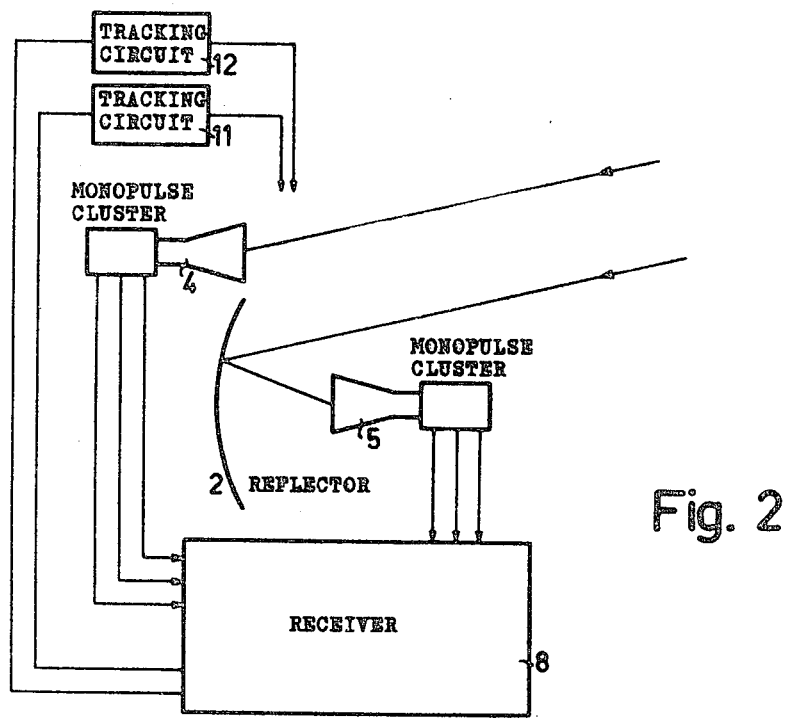
Figure 3:
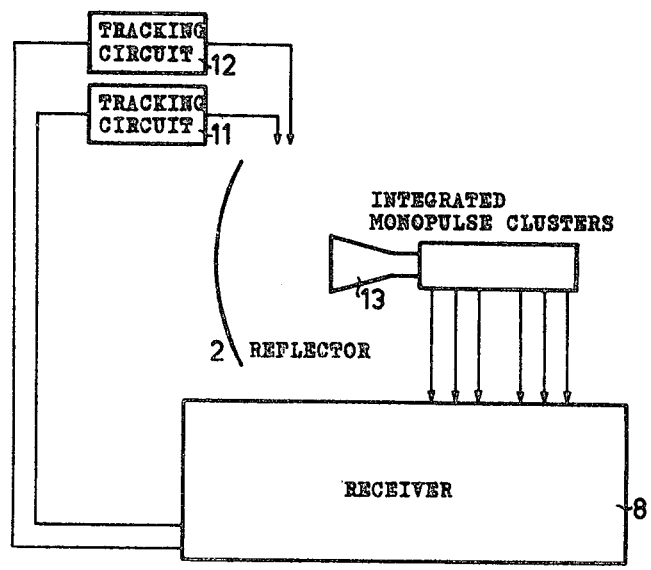

The invention will now be described with reference to the accompanying drawings, schematically illustrating a monopulse radar system according to the invention, wherein:

FIG. 1 illustrates schematically an embodiment of the monopulse radar apparatus according to the invention, and FIGS. 2 and 3 show alternate embodiments of antenna configurations in accordance with the invention.

The Cassegrain antenna 1 shown in FIG. 1 comprises a main reflector 2, a subreflector 3 and a monopulse cluster or feed system 4. The monopulse cluster includes a four-horn feed and is adpated to receive vertically polarised r.f. signals in four receiving patterns symmetrically disposed with respect to the antenna axis of symmetry and to convert the r.f. signals into sum and difference signals. If a target is located off the antenna axis of symmetry in azimuth and the radiation from this target is vertically polarised, the monopulse cluster 4 delivers a difference signal $\Delta A$. If this radiation is, however, horizontally polarised, a difference signal $\Delta E$ is produced by the monopulse cluster 4. Similarly, if the target is located off the antenna axis of symmetry in elevation and the radiation from the target is vertically polarised, the monopulse cluster 4 delivers a difference signal $\Delta E$; if this radiation is horizontally polarised, a difference signal $\Delta A$ is produced. That is, if horizontally polarised radiation is incident on the antenna, the antenna is steered off the target. When the indicent radiation is of an arbitrary polarisation, it may be resolved into vertical and horizontal polarisation components. Since the monopulse cluster 4 detects the component of horizontal polarisation to a limited extent only, the ratio between the vertical component and the horizontal component, still permitting more or less errorless tracking of the target, lies in an order of magnitude which is determined by a polarisation rotation of 80°–87° with respect to the vertical. Only radiation of horizontal or substantially horizontal polarisation is found to produce angle-tracking errors. These errors can, however, be prevented by detecting the radiation of horizontal or substantially horizontal polarisation separately and by deriving control voltages from the detected signals to keep the antenna directed at the target. The antenna 1, therefore, is provided with a second monopulse cluster 5, which in the embodiment in question, also includes a four-horn feed, tuned to the same frequency as the monopulse cluster 4. Cluster 5 is arranged to receive horizontally polarised r.f. signals in four receiving patterns symmetrically disposed with respect to the antenna axis of symmetry and to convert the r.f. signals into second sum and difference signals. The monopulse cluster 5 is rotated 90° with respect to the monopulse cluster 4, one monopulse cluster being situated at the zenith and the other at the focus of the main reflector. The subreflector 3 is formed by a wire grid. Another feasible arrangement of the monopulse clusters is illustrated in FIG. 2. In this figure the monopulse cluster 5 is positioned at the focus of the reflector 2 and the monopulse cluster 4 is disposed beside the reflector 2. It is also possible to integrate the two monopulse clusters 4 and 5 to form one unit and to place it at the focus of the reflector 2 or, if a Cassegrain antenna is employed, at the zenith of the main reflector 2. See e.g. A. F. Sciambi Jr.: "Five-horn Feed Improves Monopulse Performance", Microwaves, June 1972, pp. 56–58.

An arrangement with two integrated monopulse clusters is illustrated in FIG. 3. In this embodiment the integrated cluster 13 is positioned at the focus of the reflector 2.

In units 6 and 7, forming part of a receiver 8, the r.f. sum and difference signals from monopulse clusters 4 and 5 are converted and amplified, in a conventional way, to form i.f. sum and difference signals. The first i.f. sum and difference signals supplied by unit 6 are designated by $\Sigma_1$, $\Delta A_1$ and $\Delta E_1$ and the second i.f. sum and difference signals supplied by unit 7 by $\Sigma_2$, $\Delta A_2$ and $\Delta E_2$. The receiver 8 further comprises a switching unit 9 which passes either the first or the second i.f. sum and difference signals. The sum and difference signals passed through the switching unit 9 are designated by $\Sigma$, $\Delta A$ and $\Delta E$. These signals are applied to a unit 10 which produces angular error signals in a conventional way by means of phase detection. The magnitude and the polarity of each error signal depend on the amplitude ratio between either the first sum signals and the relevant first difference signals, or the second sum signals and the relevant second difference signals, the amplitude ratio varying in accordance with the target deviation with respect to the antenna axis of symmetry. The angular error signals are therefore proportional to the amplitude ratio between $\Delta A$ and $\Sigma$ or $\Delta E$ and $\Sigma$, as the case may be. Each of the angular error signals controls a tracking circuit 11 or 12, to keep the antenna directed at the target. In the embodiment in question, the switching unit is operative in the intermediate-frequency range. It will be clear that the switching unit may also be incorporated in the receiver 8 after obtaining angular error signals through phase detection. Even r.f. switching may be applied. Whatever the location of the switching unit in the receiver 8, it is, in all cases, controlled through a comparator 13. Comparator 13 delivers signals which are proportional to a specific amplitude ratio between the first and the second sum signals since the ratio between the vertical and the horizontal polarisation components determines which monopulse cluster is to be used to track the target.

The embodiment concerned is based on the use of two monopulse clusters, one of which is arranged to receive vertical and the other one horizontal polarisation. The monopulse clusters may of course also be arranged to receive random linear polarisations; their mutual disposition should, however, be orthogonal or substantially orthogonal.

The two monopulse clusters, whose mutual disposition is orthogonal or substantially orthogonal, may also be arranged to receive signals with specific elliptical polarisations. However, in such a case, these polarisations should also be predominantly orthogonal. Such an embodiment may be realised by providing the two monopulse clusters with polarisers. A feasible solution is to mount the polarisers at right angles to each other in the respective monopulse clusters and at an angle of 45° to the main axes of the clusters. One monopulse cluster should then be positioned at the focus of the reflector and the other at the side of the reflector. If radiation of arbitrary elliptical polarisation is received, this may be considered to consist of the two mutually orthogonal elliptical polarisation components to which the monopulse clusters, equipped with polarisers, are attuned. Of the elliptical polarisation components passed by the polarisers, only the linear polarisation component of the respective monopulse cluster is passed in the clusters themselves. Further, the signals supplied by the monopulse clusters are equal to those in the case described above for a specific linear polarisation.

Another feasible solution is to mount the polarisers parallel to each other on the monopulse clusters but at an angle of 45° to the main axes of these clusters. However, in such a case, both monopulse clusters should either operate without the use of a reflector or be situated at the focus of the reflector.

Polarisers suitable for the purposes described above are known and are described, for example in an article by A. J. Laid, M. A. entitled "Broadband Circular Polarisers", The Marconi Review, Second Quarter 1969, pp. 159–184. It should further be noted that, if the monopulse clusters are equipped with polarisers, it is not possible to use a Cassegrain antenna configuration with a wire-grid subreflector and the monopulse clusters situated at, respectively, the zenith and the focus of the main reflector. With a Cassegrain antenna arrangement the monopulse clusters have to be integrated with each other and installed at the zenith of the main reflector, while the subreflector should form a closed surface. It is of course also possible to have an arrangement where the two monopulse clusters, integrated with each other and equipped with a polariser, are installed at the focus of a relevant reflector. In such a case, the polariser is inclined at an angle of 45° to the main axes of the integrated clusters.

Monopulse radar systems of the type described above are generally provided with a transmitter. The transmission then occurs via the sum channel of one of the monopulse clusters. In the given embodiment, vertically polarised radiation may, for example, be emitted, whereas the radiation received may be of a random polarisation direction. Hence, the presence of a monopulse cluster 4 arranged to receive only the polarisation orthogonal to the transmitted polarisation. The monopulse cluster used for transmission is arbitrary; reception of radiation however occurs via both clusters.

I claim:

1. A monopulse radar system for automatic angle tracking of a moving target, said system comprising a first and a second monopulse cluster both adapted to receive r.f. signals in four receiving patterns symmetrically disposed with respect to the antenna axis of symmetry and to convert the r.f. signals into first and second sum signals and into first and second difference signals, said monopulse clusters being tuned to the same frequency band and arranged to receive mutually orthogonal polarisations with r.f. signals being transmitted through one monopulse cluster only; a receiver provided with a switching unit, said receiver, in response to the sum and the difference signals from the two monopulse clusters, delivering angular error signals, the amplitude and the polarity of each of said error signals being dependent upon the amplitude ratio between either the first sum signals and the relevant first difference signals, or the second sum signals and the relevant second difference signals, said amplitude ratio varying in accordance with target deviation with respect to the antenna axis of symmetry; and a tracking circuit for each of the angle coordinates, said tracking circuit being controlled by the relevant angular error signal from the receiver.

2. A monopulse radar system as claimed in claim 1, wherein said receiver comprises a comparator and said switching unit is controlled by signals which are supplied by the comparator and which represent the amplitude ratio between said first and second sum signals.

3. A monopulse radar system as claimed in claim 2, including first and second means for transforming the first and second sum and difference signals from the two monopulse clusters to first and second intermediate frequency sum and difference signals, respectively, and means coupled to said tracking circuit for generating said angular error signal in response to said intermediate frequency sum and difference signals, wherein the switching unit in a first position is connected to said first means for passing to said generating means the first sum and difference intermediate frequency signals and in a second position is connected to said second means for passing to said generating means the second sum and difference intermediate frequency signals.

4. A monopulse radar system as claimed in claim 1, wherein each of the monopulse clusters is adapted to receive linearly polarised radiation and the monopulse clusters are arranged at right angles or substantially at right angles to each other in an antenna of the monopulse radar in order to receive radiation components with mutually perpendicular directions of polarisation.

5. A monopulse radar system as claimed in claim 1, including an antenna reflector, one of said monopulse clusters being positioned at the focus of said reflector and the other monopulse cluster being positioned at the side of said reflector, and wherein each of the monopulse clusters includes a polarizer mounted at right angles to each other and at an angle of 45° to the main axes of the monopulse clusters for receiving elliptically polarised radiation.

6. Monopulse radar apparatus as claimed in claim 1, wherein said two monopulse clusters are integrated with each other, said integrated cluster including a polariser which is inclined at an angle of 45° to the main axes of said integrated cluster.

* * * * *